US010393224B2

(12) United States Patent
Otremba

(10) Patent No.: US 10,393,224 B2
(45) Date of Patent: Aug. 27, 2019

(54) CYLINDRICAL ROTATIONAL BODY

(71) Applicant: Enrichment Technology Company Ltd. Zweigniederlassung Deutschland, Jülich (DE)

(72) Inventor: Frank Otremba, Stolberg (DE)

(73) Assignee: ENRICHMENT TECHNOLOGY COMPANY LTD. ZWEIGNIEDERLASSUNG DEUTSCHLAND (DE)

( * ) Notice: Subject to any disclaimer, the term of this patent is extended or adjusted under 35 U.S.C. 154(b) by 0 days.

(21) Appl. No.: 16/074,597

(22) PCT Filed: Feb. 1, 2017

(86) PCT No.: PCT/EP2017/052113
§ 371 (c)(1),
(2) Date: Aug. 1, 2018

(87) PCT Pub. No.: WO2017/134085
PCT Pub. Date: Aug. 10, 2017

(65) Prior Publication Data
US 2019/0040933 A1 Feb. 7, 2019

(30) Foreign Application Priority Data
Feb. 2, 2016 (EP) .................... 16153918

(51) Int. Cl.
*H02K 7/02* (2006.01)
*F16F 15/30* (2006.01)
*F16F 15/305* (2006.01)

(52) U.S. Cl.
CPC .......... *F16F 15/305* (2013.01); *H02K 7/025* (2013.01); *F16F 2224/0241* (2013.01); *Y02E 60/16* (2013.01)

(58) Field of Classification Search
CPC .. F16F 15/30; F16F 15/305; F16F 2224/0241; H02K 7/02; H02K 7/025; Y02E 60/16
See application file for complete search history.

(56) References Cited

U.S. PATENT DOCUMENTS

| 5,061,533 A | 10/1991 | Gomi et al. |
| 5,285,699 A * | 2/1994 | Walls ................. B29D 99/0046 74/572.12 |

(Continued)

FOREIGN PATENT DOCUMENTS

| EP | 0391222 A1 | 10/1990 | |
| EP | 1191253 A1 | 3/2002 | |
| EP | 3210752 A1 * | 8/2017 | ........... B29C 53/585 |

OTHER PUBLICATIONS

International Search Report for corresponding International application No. PCT/EP2017/052113 dated Mar. 27, 2017.

(Continued)

Primary Examiner — Adam D Rogers
(74) Attorney, Agent, or Firm — Tarolli, Sundheim, Covell & Tummino LLP

(57) ABSTRACT

A rotational body, to a rotor and to a flywheel energy storage unit having such rotational bodies is disclosed and a method for the production of a rotational body, having a cylinder jacket at least partially wound using a fiber-reinforced composite. A cylinder axis includes open cylinder base surfaces, whereby the cylinder jacket, with its inside facing the axis of rotation and its outside oriented in the opposite direction, has a length parallel to the axis of rotation of more than twice the outer diameter of the rotational body, and it has a wall thickness that is less than 12.5% of the outer diameter. The fiber-reinforced composite of the cylinder jacket has a layered structure in the radial direction comprising helical layers of fibers which extend along the axis (Continued)

of rotation and whose orientation along the helical fiber angle is less than 35° relative to the axis of rotation.

12 Claims, 5 Drawing Sheets

(56) References Cited

U.S. PATENT DOCUMENTS

| | | | | |
|---|---|---|---|---|
| 5,692,414 | A * | 12/1997 | Gregoire | F16F 15/305 74/572.12 |
| 5,778,735 | A * | 7/1998 | Groves | G05G 1/10 74/572.12 |
| 6,350,204 | B1 | 2/2002 | Yasui et al. | |
| 6,824,861 | B2 * | 11/2004 | Spears | B32B 5/08 242/437.3 |
| 9,409,376 | B2 * | 8/2016 | Sonnen | B29C 70/86 |
| 9,816,583 | B2 * | 11/2017 | Baumer | F16F 15/305 |
| 2010/0018344 | A1 | 1/2010 | Spears et al. | |
| 2015/0345541 | A1 * | 12/2015 | Sonnen | B29C 70/32 464/181 |

OTHER PUBLICATIONS

International Preliminary Report on Patentability for corresponding international application No. PCT/EP2017/052113 dated Feb. 8, 2018.

* cited by examiner

CYLINDRICAL ROTATIONAL BODY

RELATED APPLICATIONS

The present invention is a U.S. National Stage under 35 USC 371 patent application, claiming priority to Serial No. PCT/EP2017/052113, filed on 1 Feb. 2017; which claims priority of EP 16153918.4, filed on 2 Feb. 2016, the entirety of both of which are incorporated herein by reference.

FIELD OF THE INVENTION

The invention relates to a rotational body, to a rotor and to a flywheel energy storage unit having such rotational bodies as well as to a method for the production of such a rotational body.

BACKGROUND OF THE INVENTION

Flywheels are used to store energy in the form of rotational energy. Suitable coupling means (motor-generator units) can be used to store electric energy in these energy storage units in the form of rotational energy and, whenever necessary, this energy can be converted back into electric energy and can be transmitted to a consumer. For the most part, such flywheel energy storage units have a massive rotor which, depending on its rotational speed and mass, stores a certain amount of energy. The storage capacity of such an energy storage unit is limited by its mass and by its maximum rotational speed. In this context, the rotor is usually connected by suitable connection means to a bearing shaft that holds the rotor. The bearing shaft is mounted in appropriate bearings so that it can rotate. Here, the bearing elements and drive elements are preferably located on the axis of rotation of the rotor. In this context, the connection means have the function of creating a connection and an attachment between the external flywheel body (rotational body) and the carrying axle (shaft) as well as to ensure the transmission of the torsional moment from the drive shaft to the flywheel body (rotational body), and vice versa. The rotational bodies have to exhibit good-quality manufacturing, high strength and great stiffness under flexural load in order to achieve a reliable and trouble-free operation of the rotors.

Up until now, rotors with rotational bodies are generally configured as disk-shaped, very thick-walled components. The wall thickness of the rotational bodies is in the same order of magnitude as the diameter, whereas the length along the axis of rotation is smaller than or similar to the diameter. In this context, when carbon fiber-reinforced plastics (so-called CFRP materials) are used as the material for the rotational body, the flywheel disks usually consist of fibers oriented virtually in the circumferential direction.

Since the energy storage capacity exhibits a quadratic dependence on the rotational speed of the mass, this concept entails a few drawbacks. The fibers, which are situated relatively far towards the inside (near the axis of rotation), have a considerably lower rotational speed and therefore can hardly store energy. Moreover, this structure gives rise to large radial tensile stresses that can damage the rotors. This can only be avoided by means of complex design measures such as manufacturing several sub-rings and pressing them together to form a rotational body. Moreover, due to the thickness of the walls, the production is extremely difficult and laborious so that this always creates problems, for instance, with fiber kinks, the fiber volume content, waviness and delamination.

Nowadays, there is a widespread move towards regenerative energy sources, especially in view of their greater environmental friendliness in comparison to conventional energy generation systems. Since, as a rule, these regenerative energy sources do not deliver their energy continuously, there is a great need for energy storage units. For this reason, it is desirable for the energy content of such a flywheel energy storage unit to be raised even further and for the costs for their production to be lowered.

SUMMARY OF THE INVENTION

It is an objective of the present invention to put forward suitable inexpensive and reliable rotors for flywheel energy storage units, whereby the flywheel energy storage unit has a large energy content and its production and operation can nevertheless be carried out simply, inexpensively and reliably.

This objective is achieved by an internally hollow cylindrical rotational body having a cylinder jacket that is at least partially wound using a fiber-reinforced composite, also having a cylinder axis as the axis of rotation and having open cylinder base surfaces, whereby the cylinder jacket, with its inside facing the axis of rotation and with its outside oriented in the opposite direction, has a length parallel to the axis of rotation of more than twice the outer diameter of the rotational body, and it has a wall thickness that is less than 15% of the outer diameter or less than 50 mm, whereby the fiber-reinforced composite of the cylinder jacket has a layered structure in the radial direction comprising several helical layers of fibers which extend along the axis of rotation and whose orientation along the helical fiber angle is less than 35° relative to the axis of rotation, and comprising several circumferential layers which are arranged tangentially thereto over the length of the cylinder jacket and which consist of fibers whose orientation along the circumferential fiber angle is greater than 80° relative to the axis of rotation, whereby the helical layers and the circumferential layers are arranged alternatingly one above the other, and all of the helical layers are arranged in the inner one-third of the cylinder jacket, as seen in the radial direction.

In this context, the energy content of the rotational body is determined by the mass and the rotational speed. Here, the speed enters into the energy content as a quadratic value. Cylindrical rotational bodies having a cylinder jacket with a slight wall thickness are advantageous since, in these rotors, the total mass rotates on virtually the same radius (mean radius±half the wall thickness, which is, after all, being kept slight), and therefore, all of the fibers contribute equally to the energy storage. For this reason, in terms of the fiber utilization, the efficiency of the rotational body in a flywheel energy storage unit is particularly high in contrast to conventional designs that employ disk-shaped, thick-walled rotors. In order to maximize the energy content at a given radius of the rotational body, the rotational body is manufactured so as to be as long as possible (long cylinder height parallel to the axis of rotation). A rotational body according to the invention has, for instance, a length of 1300 mm, an external diameter of 350 mm and a wall thickness of the cylinder jacket of 20 mm. The weight of such a rotational body is approximately 40 kg. Owing to the slight wall thickness of the cylinder jacket of the rotational body, it can be manufactured in one piece as a wound part, something which is not possible with thicker cylinder jackets. Consequently, the production of the rotational body is simpler and faster. In order for such a long rotational body having a slight wall thickness to be able to rotate, its stiffness under flexural load has to be increased considerably in comparison to rotational bodies of the prior-art design so that the first flexural natural frequency of the long rotor tube is sufficiently above the rotational frequency that corresponds to the rotational speed of the rotor during operation. This is achieved with the layered structure of the fiber-reinforced composite according to the invention.

A fiber-reinforced composite generally consists of two main components, in the case here, of fibers embedded in a matrix material that creates the firm bond between the fibers. In this context, the fiber-reinforced composite can be wound from a fiber bundle or from several fibers of the same type or of different types, whereby the fiber(s) can be wound in contact with each other very tightly next to each other. This gives rise to a fiber layer onto which the fibers are wound in additional fiber layers until the fiber-reinforced composite has acquired the desired thickness. A packet consisting of one or more fiber layers made of a fiber-reinforced composite is referred to as a fiber layered structure (helical layer or circumferential layer). In this context, depending on the application purpose, the fiber-reinforced composite can comprise a varying number of fiber layers (helical layers plus circumferential layers), whereby the various fiber layers differ, for example, in terms of their appertaining fiber angles. The term "fiber angle" (helical fiber angle, circumferential fiber angle) refers here to the mean (averaged) angle between the axis of rotation and the orientation of the wound fibers (fiber direction) in the fiber layer, whereby, when it comes to the fiber angle, no distinction is made between the winding direction (forward/backward or right/left). Therefore, for example, fibers that cross in helical layers have the same fiber angle (same numerical value). Owing to the bond, the fiber-reinforced composite acquires higher quality properties; for instance, its strength is higher than the strength that each of the two individual components involved would be able to deliver. Carbon fibers, particularly highly stressable or very stiff carbon fibers, can be used as the fibers. For example, thermosetting plastics or thermoplastics can be used as the matrix materials. The material properties of the fibers and of the matrix materials are known to the person skilled in the art, so that this person can select a suitable combination of fibers and matrix materials for the production of the fiber-reinforced composite for a given application. In this context, the fiber layer(s) in the area of the fiber bond can comprise one or more identical or different fibers. The rotational body here can be made of fiber-reinforced composite, either completely or else only in an area of a fiber bond. The fiber-reinforced composites in the helical layers and the fiber-reinforced composites in the circumferential layers can comprise the same fibers and the same matrix material or else they can differ in terms of the selection of the appertaining fibers and/or of the appertaining matrix materials. The term "area of the fiber bond" designates an area or volume of the rotational body that consists at least for the most part of only fiber-reinforced composites. In one embodiment, the rotational body is completely made of fiber-reinforced composite. Such a rotational body exhibits the highest strength values at a low weight. The layered structure of the fiber-reinforced composite refers to the sequence of helical and circumferential layers wound over each other as seen in the radial direction. In this context, the radial direction is the direction perpendicular to the axis of rotation from the inside to the outside of the cylinder jacket. The alternating sequence of helical and circumferential layers additionally causes circumferential layers to be wound over all of the helical layers, as a result of which excess resin and any air bubbles that might be present between the fibers that cross within the helical layer are squeezed out of the areas in the wound-over helical layers, and this further increases the strength of the material bond of the fiber-reinforced composite. The outer layer (facing the outside) of the cylinder jacket is then formed by a circumferential layer.

Owing to the fiber properties and the fiber angles, the helical layers impart the rotational body with a high stiffness under flexural load. A sufficient flexural strength is achieved for use in flywheel energy storage units, even in the case of a small number of helical layers. Highly stiff carbon fibers, often pitch fibers, are employed for the helical layers with fiber angles of less than 35°. In the case of circumferential layers with fiber angles greater than 80° relative to the axis of rotation, for instance, strong or high-strength carbon fibers are used. The circumferential layers impart the rotational body with strength in the radial direction, they ensure the smallest possible expansion of the rotational body during rotation, and they serve to support the helical layers, which would not be able to support themselves on their own. The rotational load gives rise to radial tensile stresses within the circumferential layers. These stresses act perpendicularly to the fiber direction and can therefore easily damage the material. If the helical layers were not supported by the circumferential layers, they would be much more strongly deformed under the given rotational load. Therefore, they are supported on the subsequent outer circumferential layer where they thus generate a radial compressive stress. In this manner, with a suitable configuration, they can completely or at least partially compensate for the radial tensile stresses. The alternating arrangement of helical and circumferential layers is particularly advantageous for this compensation of the tensile stresses. However, such a support also gives rise to an increase in the tangential stresses in the circumferential layers. For this reason, it is advantageous to employ precisely only as many helical layers as absolutely necessary for the requisite stiffness under flexural load.

Within the helical layers and between the helical and circumferential layers, shear stresses that can damage the material also arise during the rotational loads. These tensile stresses are greater in helical layers that are further towards the outside, which is why helical layers that are further towards the inside are advantageous in terms of this aspect. On the other hand, helical layers that are further towards the outside contribute more to the desired increase in the stiffness under flexural load. Consequently, a helical layer closer to the outside would be advantageous. The construction of a suitable layered structure has to take into consideration all of these at times contradictory aspects. Suitable and optimal layered structures can be computed, for instance, by means of finite element programs and optimization algorithms.

Since all of the helical layers are arranged in the inner one-third of the cylinder jacket as seen in the radial direction, this construction (layered structure) of the cylinder jacket minimizes the shear stresses that occur between the helical layers and the circumferential layers at the transition site between the various layers, whereby the tensile stresses are likewise favorably influenced by the helical layers that are further towards the inside.

Therefore, by means of the claimed layered structure, very long rotational bodies with slight wall thicknesses can be produced which nevertheless display sufficient stiffness under flexural load, thereby allowing applications at 50,000 rpm, at which speed the rotational body can be operated in a stable and reliable manner. In this context, the inside of the cylinder jacket is preferably formed by a helical layer. The uniform load on the fibers in the thin-walled design allows a markedly lower consumption of fiber-reinforced composite and therefore, the rotational body according to the invention can be built considerably less expensively than conventional designs, whereby, in terms of energy storage, the cost-effectiveness of the rotational body according to the invention is attained through its structural length. With the rotational body according to the invention, a suitable, inexpensive and reliable component for rotors for flywheel energy storage units is being put forward with which the flywheel energy storage unit can have a high energy content and whose storage and operation can nevertheless be carried out easily, inexpensively and reliably.

In one embodiment, the helical fiber angles are between 15° and 30°. At fiber angles within this range, the helical layers impart the rotational body with the highest values of stiffness under flexural load. In another embodiment, the helical fiber angles of the various helical layers can differ.

In one embodiment, the helical fiber angles increase in the radial direction from one helical layer to the next helical layer as the distance from the axis of rotation increases. As a result, the compensation of the radial tensile stresses is maximized. In this context, for this purpose, the helical fiber angles preferably increase in the radial direction from 23° for the innermost helical layer to 30° for the outermost helical layer.

In one embodiment, in order to provide a very stable cylinder jacket, the layered structure of the fiber-reinforced composite comprises at least five helical layers. A certain number of circumferential layers is wound over these helical layers. In one embodiment, the total thickness of all of the helical layers does not amount to more than 12.5% of the wall thickness of the cylinder jacket. Here, all of the helical layers are located in the inner one-third of the wall thickness or wall portion of the cylinder jacket. This structure (layered structure) of the cylinder jacket minimizes the shear stresses that occur between the helical layers and the circumferential layers at the transition site between the various layers since several helical layers—each of which has a corresponding circumferential layer wound over it—provide several layer transitions having a correspondingly greater layer cross-linking than, for example, a packet consisting of a helical layer around which a circumferential layer has been wound or, for example, helical layers uniformly that are distributed over the entire radius.

In another embodiment, the individual helical layers have a helical layer thickness in the radial direction that is smaller than 4% of the wall thickness of the cylinder jacket. For example, the helical layer thickness is less than 0.5 mm.

Such thin helical layers are already sufficient to improve the stiffness under flexural load. Thin helical layers additionally cut back on the quantity of material needed and consequently reduce the requisite production work. For this reason, in a preferred embodiment, the helical layer thickness only amounts to the thickness of two helical fiber layers arranged crosswise over each other. Such a helical layer is the thinnest possible fiber layer in the rotational body.

In a preferred embodiment, the cylinder jacket is made completely of fiber-reinforced composite. In this manner, the rotational body can be manufactured completely out of one piece by means of a simple winding process, and yet, thanks to its layered structure according to the invention, it nevertheless exhibits advantageous stiffness under flexural load and strength values as well as low radial tensile stresses in the cylinder jacket. With such a rotational body, the helical layers and the circumferential layer extend along the axis of rotation essentially over the entire rotational body, whereby the term "essentially" refers to any beveled cut edges that might be present at the ends of the rotational body, which is negligible for the total length of the rotational body and of the layered structure that extends over it.

The invention also relates to a rotor with an internally hollow cylindrical rotational body according to the invention. Here, this rotor can comprise one or more hubs that are suitably joined to the inside of the cylinder jacket of the rotational body in order to transmit torsional moments to the cylinder jacket, whereby the hubs are each suitably mounted in a bearing via a shaft or journal and at least one of the shafts or journals can be suitably driven by a motor.

As a rule, the rotational body of a flywheel energy storage unit is connected to the bearing and drive elements of the flywheel energy storage unit via two or more hubs. In this context, on the one hand, the hubs have to effectuate a connection and attachment of the rotational body to the bearing and drive elements and, on the one hand, they have to ensure the transmission of the torsional moments from a drive shaft to the rotational body and vice versa. For this purpose, the hubs are likewise made of fiber-reinforced composite and they are characterized in that they are sufficiently stressable mechanically to be able to reliably withstand the radial and tangential loads at very high speeds of more than 50,000 rpm due to the centrifugal forces that act upon the rotational body, also to support the weight load exerted by the rotational body, to withstand the press forces that, at these rotational speeds, act upon the connection sites between the rotational body and the hub or between the hub and the journal, and to nevertheless ensure an effective transmission of the torques between the drive unit and the rotational body by virtue of tangential dimensional stability. Owing to its material and its geometric shape, the hub also has radial strainability that can be suitably adjusted so as to follow the strain of the rotational body, particularly at very high rotational speeds. In this manner, critical tensile stresses between the rotational body and the hub are avoided which could otherwise cause damage to the hub or bending or detachment of the rotational body from the hub at very high rotational speeds. Through the use of CFRP (carbon fiber-reinforced plastic) laminate, the hub also accounts for favorable crash behavior in case the rotor crashes in the flywheel energy storage unit. Moreover, the weight of the hub and thus of the rotor can be lowered in comparison to conventional hubs and corresponding rotors, which translates into a simpler mounting of the rotor on bearings. The hub can be made, for example, in one piece of a fiber material in conjunction with a matrix system. Here, the matrix material completely surrounds the braid of fibers, whereby the fibers in this braid cross each other in two different orientations. In this context, the braid can be manufactured with different levels of tightness. A high fiber volume fraction is desired for the manufacture of the hub.

A rotor according to the invention has a length of, for instance, 1300 mm, an outer diameter of 350 mm and a wall thickness (of the cylinder jacket) of 20 mm. The weight of such a rotor is approximately 40 kg. The hubs have an outer diameter that is adapted to the inner diameter of the rotational body.

In one embodiment, the hubs are arranged within the cylindrical rotational body in such a way that the hubs do not protrude out of the open cylinder base surfaces. Consequently, the bearing is situated inside the cylinder jacket and is not directly affected in case the rotor crashes.

The invention also relates to a flywheel energy storage unit having one or more rotors according to the invention that are each surrounded by a machine housing, whereby the rotor can be accelerated by a motor-generator unit of the flywheel energy storage unit in order to store electric energy and it can be braked in order to release electric energy. Thanks to the rotor according to the invention having the rotational bodies according to the invention, such a flywheel energy storage unit displays a particularly high energy-storage capacity by virtue of the above-mentioned reasons. Until now, the current kinetic energy storage units have been very costly to manufacture since a great deal of expensive fiber-reinforced composite had to be used. Due to its thickness in the form of massive disks, the fiber-reinforced composite was not efficiently employed for the storage of energy since material that is further towards the inside rotates at considerably lower speeds than material that is further towards the outside. The flywheel energy storage unit according to the invention avoids the need for substantial material resources thanks to the thin-walled structure, whereby this rotor can be efficiently operated since it can be designed so as to be very long in order to provide the requisite rotational mass.

The invention also relates to a method for the production of an internally hollow cylindrical rotational body 1 according to the invention, having a cylinder jacket, a cylindrical axis as the axis of rotation, open cylinder base surfaces and a length parallel to the axis of rotation amounting to more than twice the provided outer diameter of the rotational body, comprising the following steps:

(a) a suitable, appertaining winding mandrel is provided for the manufacture of the rotational body, whereby the cylinder jacket is wound, at least partially, using fiber-reinforced composite;

(b) helical layers consisting of fibers having an orientation along a helical fiber angle smaller than 35° relative to the axis of rotation and circumferential layers consisting of fibers having an orientation along a circumferential fiber angle greater than 80° relative to the axis of rotation are wound alternatingly around the winding mandrel using a suitable winding method until the desired thickness has been achieved for the cylinder jacket amounting to less than 15% of the outer diameter of the cylinder jacket or less than 50 mm, whereby all of the helical layers are arranged within the inner one-third of the cylinder jacket as seen in the radial direction; and (c) the fiber-reinforced composite of the rotational body is cross-linked and the winding mandrel is removed from the wound and cross-linked rotational body.

In this context, first of all, a helical layer can be wound onto the winding mandrel, subsequently a circumferential layer can be wound onto this helical layer, then another helical layer can be wound onto this circumferential layer, subsequently another circumferential layer can be wound onto this next helical layer and so on, alternating these layers until the desired thickness of the cylinder jacket has been reached.

The cross-linking of the second fiber-reinforced composite refers, on the one hand, to a cross-linking within the second fiber-reinforced composite as well as to a cross-linking with the topmost layers of the fiber-reinforced composite of the first body. In this context, the winding mandrel constitutes the substrate that defines the shape of the rotational body that is wound thereon. Therefore, the shape of the winding mandrel determines the later shape of the inside of the rotational body that is wound thereon. The cross-linking of the fibers and fiber layers is done, for instance, by means of curing in the case of reactive systems such as thermosetting plastics and by means of cooling in the case of thermoplastic systems. With this method, rotational bodies for rotors having a high specific energy-storage capacity which exhibit only low radial tensile stresses and which can be employed for inexpensive, highly stiff fibers on the basis of pitch can be produced in one piece.

In one embodiment of the method, the step of winding alternating helical layers and circumferential layers around the winding mandrel comprises one or more additional pre-cross-linking steps after the helical layer and/or one circumferential layer is wound on, preferably after every time one helical layer and/or one circumferential layer has been wound on.

BRIEF DESCRIPTION OF THE FIGURES

These and other aspects of the invention will be shown in detail in the figures as follows.

DETAILED DESCRIPTION OF THE EMBODIMENTS

Figure 1:
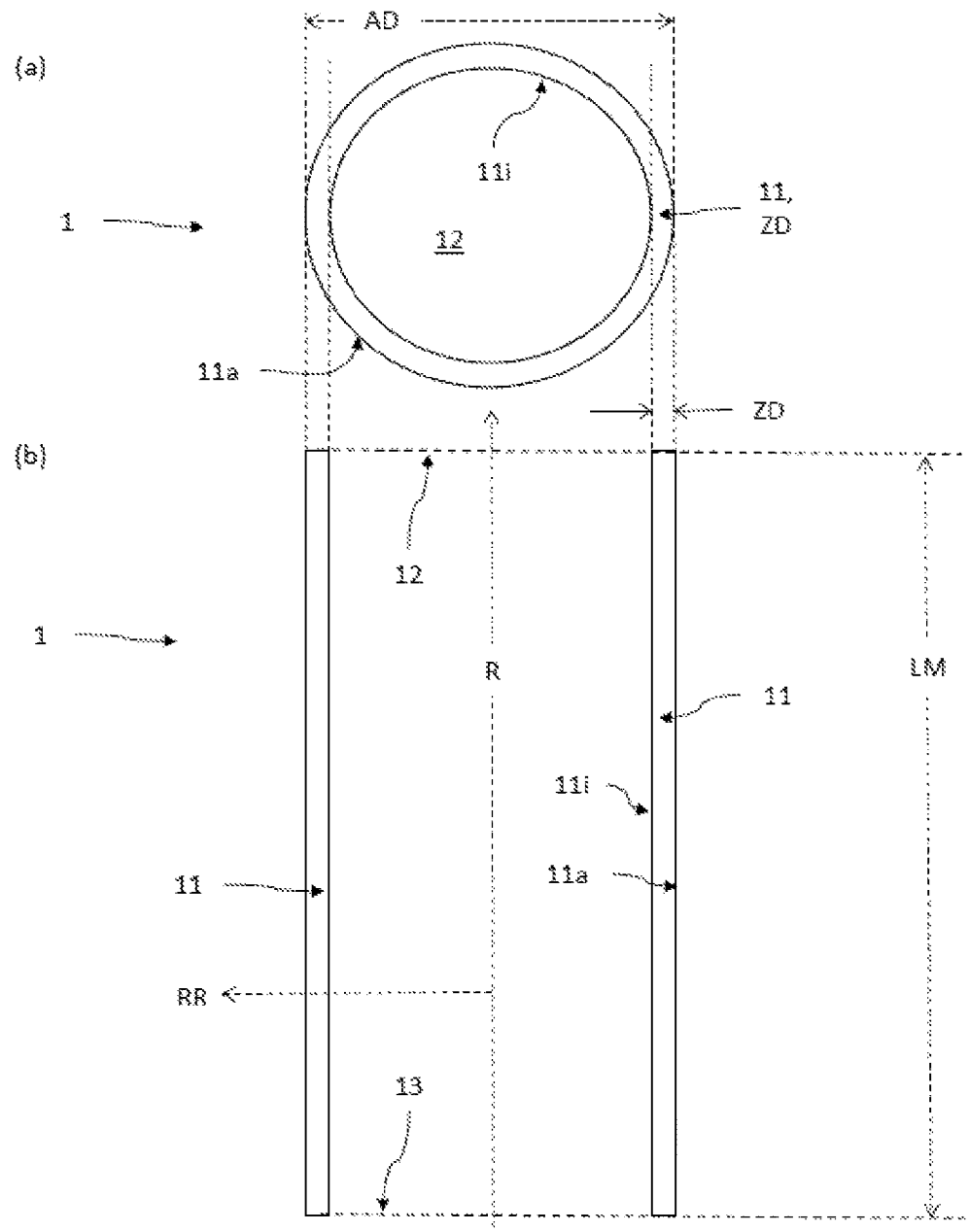
FIG. 1: an embodiment of the rotational body according to the invention, (a) in a top view onto an open cylinder base surface, and (b) in a lateral sectional view along the axis of rotation.

FIG. 1 shows an embodiment of the rotational body 1 according to the invention, (a) in a top view onto an open cylinder base surface 12 and (b) in a lateral sectional view along the axis of rotation R. In this embodiment, the rotational body 1 comprises a cylinder jacket 11 that is completely wound using fiber-reinforced composite and that has a cylinder axis as the axis of rotation R and open cylinder base surfaces 12, 13 (shown with a broken line). The cylinder jacket 11 comprises an inside 11$i$ facing the axis of rotation R and an outside 11$a$ oriented in the opposite direction, and has a length LM parallel to the axis of rotation R amounting to more than twice the outer diameter AD of the solid of rotation 1. In this context, the wall thickness ZD of the cylinder jacket 11 is smaller than 12.5% of the outer diameter AD. The fiber-reinforced composite of the cylinder jacket 11 also has a layered structure in the radial direction RR, which has several helical layers H consisting of fibers FH which extend along the axis of rotation R and which have a fiber orientation along a helical fiber angle FWH that is smaller than 35° relative to the axis of rotation R as well as and several circumferential layers FU consisting of fibers U which are arranged tangentially thereto over the length LM of the cylinder jacket 11 and which have a fiber orientation along a circumferential fiber angle FWU that is greater than 80° relative to the axis of rotation R, whereby the helical layers H and the circumferential layers U are arranged alternatingly over each other, whereby all of the helical layers H are arranged in the inner one-third of the cylinder jacket 11 as seen in the radial direction RR (in this context, also see FIGS. 2 and 3). The rotational body 1 shown here has, for instance, a length LM of 1300 mm, an outer diameter AD of 350 mm and a wall thickness ZD of the cylinder jacket 11 of 20 mm. Therefore, the helical layers H in this cylinder jacket 11 are arranged within the wall thickness range of ⅓*20 mm, starting from the inside 11i of the cylinder jacket 11. Owing to the slight wall thickness ZD of the cylinder jacket 11 of the rotational body 1, the latter can be produced in one piece as a wound component, something which is not possible with thicker cylinder jackets. Consequently, the production of the rotational body 1 is simpler and faster.

Figure 2:
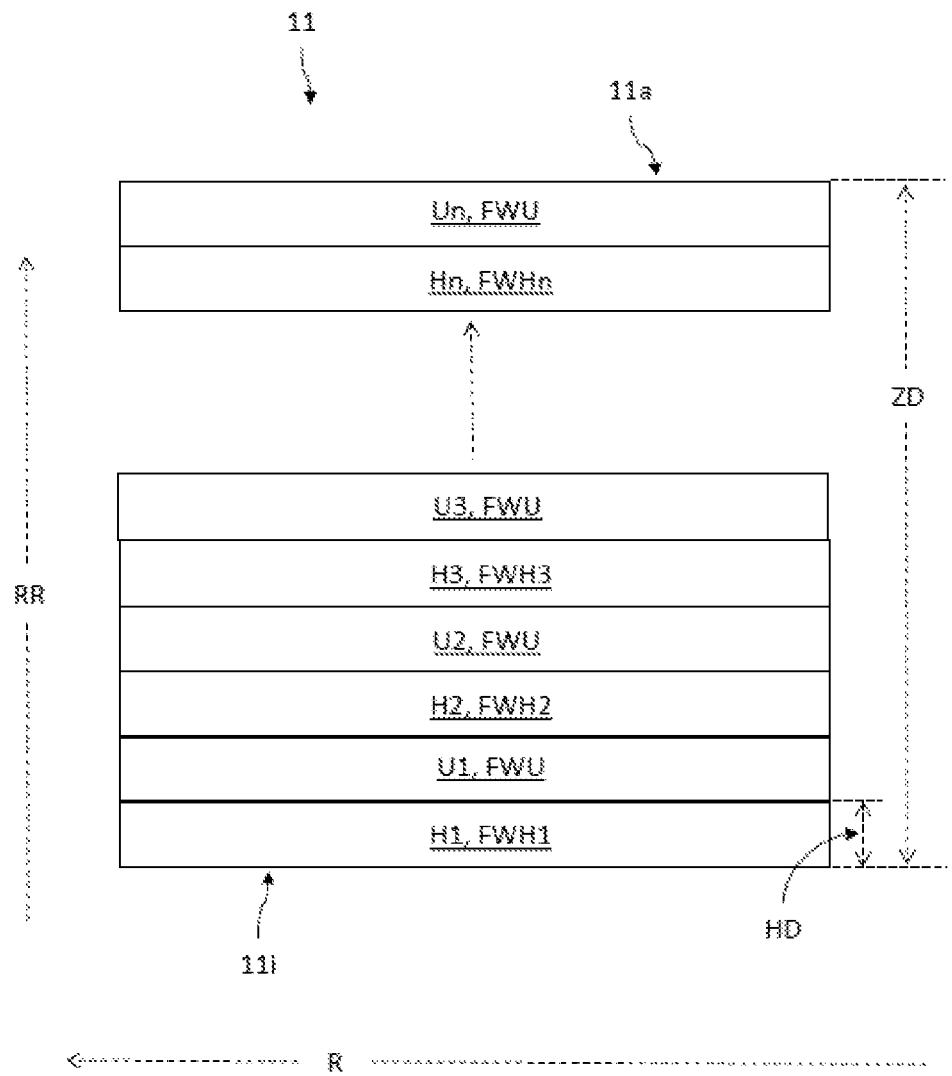
FIG. 2: an embodiment of the layered structure of the cylinder jacket with helical and circumferential layers arranged alternatingly over each other in the radial direction.

FIG. 2 shows an embodiment of the layered structure of the cylinder jacket 11 with helical and circumferential layers H1, U1, H2, U2, H3, U3, . . . , Hn, Un, which are arranged alternatingly over each other. Here, the cylinder jacket 11 is made completely of fiber-reinforced composite. The depicted layer sequence H1 to Un is shown schematically, whereby the layer thicknesses are not shown true to scale here. Individual layers (helical or circumferential layers) can have different layer thicknesses; in particular, the circumferential layers U1, U2, U3, . . . , Un can have greater layer thicknesses than the helical layers H1, H2, H3, . . . , Hn. In the individual helical layers H1, . . . , Hn, the helical fiber angles FWH1, . . . , FWHn are between 15° and 30°. In this context, the helical fiber angles FWH1, FWH2, FWH3, . . . , FWHn in the various helical layers H1, H2, H3, . . . , Hn can differ. In one embodiment, the helical fiber angles FWH1, FWH2, FWH3, . . . , FWHn can increase from one helical layer to the next helical layer in the radial direction RR as the distance from the axis of rotation R of the appertaining helical layers H1, H2, H3, . . . , Hn increases. In this context, in one preferred embodiment, the helical fiber angles FWH1, FWH2, FWH3, . . . , FWHn increase in the radial direction RR from 23° to 30°. Here, all of the helical layers H1, H2, H3, . . . , Hn are arranged in the inner one-third of the cylinder jacket 11 as seen in the radial direction RR. In this manner, the topmost circumferential layer Un has a layer thickness that makes up 66% or more of the wall thickness ZD. In one embodiment, the layered structure shown comprises at least five helical layers H1 . . . Hn. Here, preferably the sum of all of the helical layer thicknesses (total thickness of all of the helical layers) does not amount to more than 12.5% of the wall thickness ZD of the cylinder jacket 11. Preferably, in the radial direction RR, the individual helical layers H1 . . . Hn have a helical layer thickness HD that is smaller than 4% of the wall thickness of the cylinder jacket; preferably, the helical layer thickness HD is smaller than 0.5 mm. The alternating sequence of helical and circumferential layers H1, U1, H2, U2, H3, U3, . . . , Hn, Un additionally causes circumferential layers U1, U2, U3, . . . , Un to be wound over all of the helical layers H1, H2, H3, . . . , Hn, as a result of which excess resin and any air bubbles that might be present between the fibers that cross each other within the helical layer are squeezed out of the areas in the appertaining wound helical layer H1-Hn, thereby further increasing the strength of the material bond of the fiber-reinforced composite. The outer layer (facing the outside 11a) of the cylinder jacket 11 is then formed by a circumferential layer Un.

Figure 3:
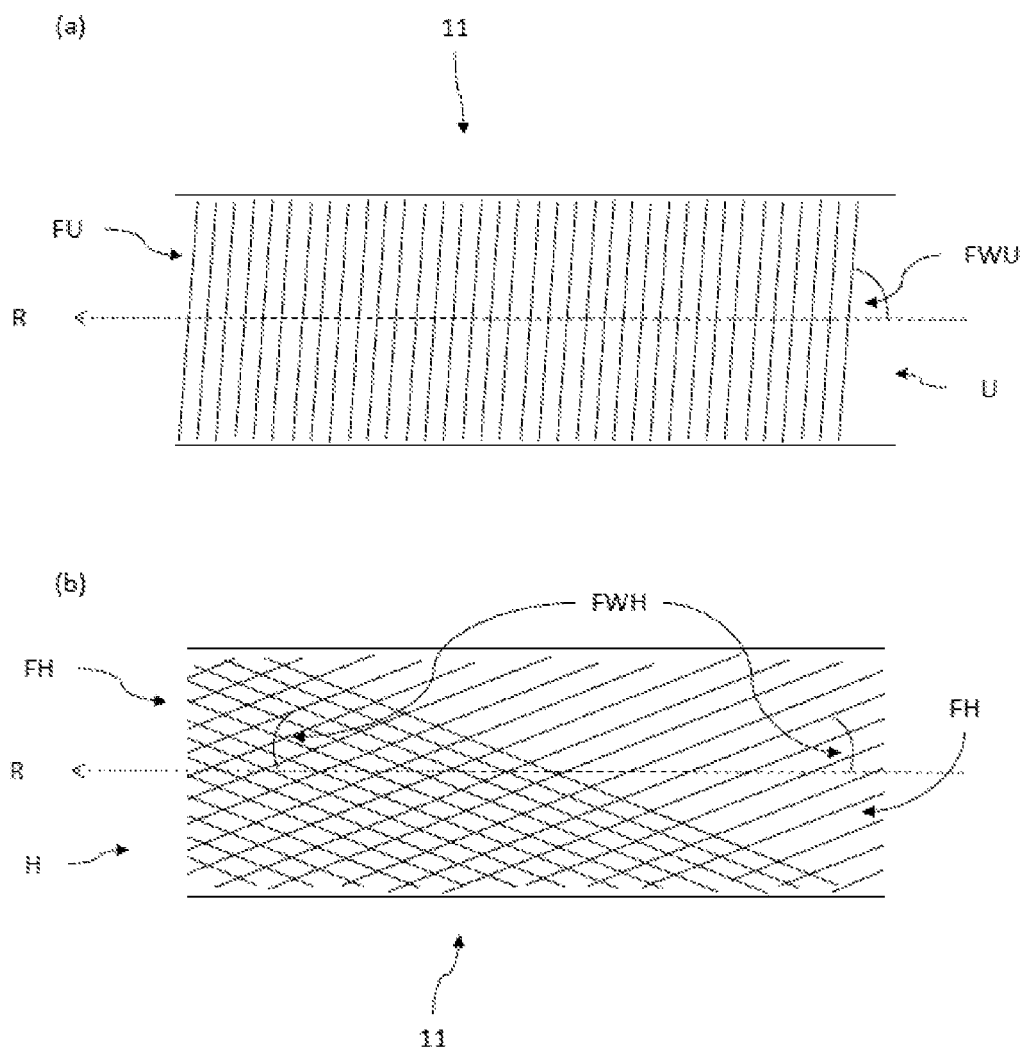
FIG. 3: an embodiment of fiber layouts in (a) circumferential layers and (b) helical layers, in a top view perpendicular to the axis of rotation.

FIG. 3 shows an embodiment of fundamental fiber layouts (a) in circumferential layers U and (b) in helical layers H, in a top view perpendicular to the axis of rotation R. A packet consisting of one or more fiber layers made of a fiber-reinforced composite is designated here as a fiber layer (helical layer H or circumferential layer U). This figure shows the topmost layer consisting of fibers FU, FH of a given layer, whereby the topmost fiber layer of the helical layer H is depicted as an incomplete fiber layer in order to show the crossing helical fibers FH. The mean (averaged) fiber angles FWH, FWU between the axis of rotation R and the orientation of the wound fibers (fiber direction) in the fiber layer are referred to as the helical fiber angle FWH and circumferential fiber angle FWU, whereby, when it comes to the fiber angles FWH, FWU, no distinction is made between the winding direction (forward/backward or right/left). Thus, for example, the fibers that cross in the helical layer H shown here have the same fiber angle FWH (same numerical value). In this context, the helical fiber angle FWH of the rotational body 1 according to the invention is smaller than 35° while the circumferential fiber angle FWU is greater than 80°. Depending on the embodiment, the helical fiber angle FWH can be between 15° and 30°, and the helical fiber angles FWH in various helical layers H can be different. In this context, the helical fiber angles FWH can increase from one helical layer to the next helical layer in the radial direction RR as the distance from the axis of rotation R increases. Here, the helical fiber angles FWH can increase in the radial direction RR, for example, from 23° to 30°. The individual helical layer thickness HD here corresponds to at least the thickness of two helical fiber layers that are arranged crosswise with respect to each other; see FIG. 3(b).

Figure 4:
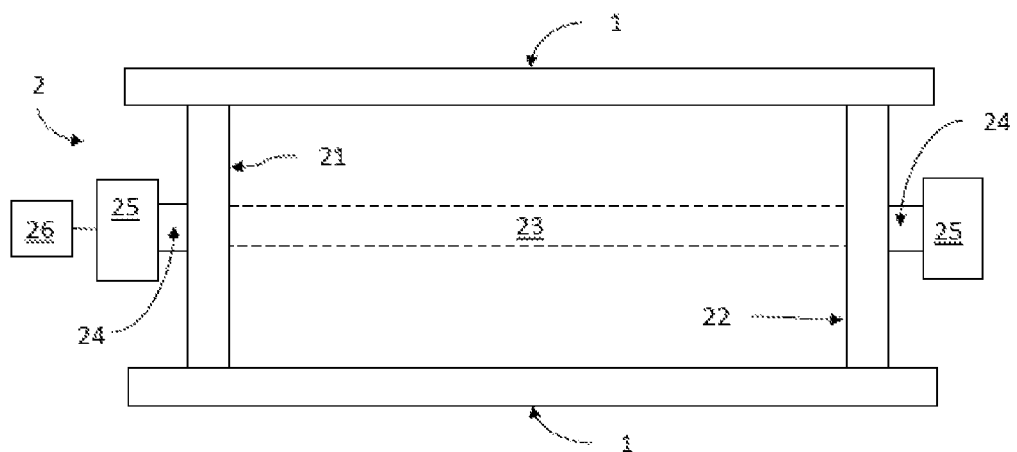
FIG. 4: an embodiment of the rotor according to the invention, in a lateral sectional view.

FIG. 4 shows an embodiment of the rotor 2 according to the invention, in a lateral sectional view, with an internally hollow rotational body 1 according to the invention. This rotor 2 comprises two hubs 21, 22 that are suitably joined to the inside 11i of the cylinder jacket 11 of the rotational body 1 in order to transmit torsional moments to the cylinder jacket 11, whereby the hubs 21, 22 are each suitably mounted in a bearing 25 via a shaft 23 (shown here by a broken line) or journal 24, and at least one of the journals 24 or the shaft 23 can be suitably driven by a motor 26. The hubs 21, 22 can likewise be made of fiber-reinforced composite and they are characterized in that they are sufficiently stressable mechanically to be able to reliably withstand the radial and tangential loads at very high speeds of more than 50,000 rpm due to the centrifugal forces that act upon the rotational body 1, also to support the weight load exerted by the rotational body 1, to withstand the press forces that, at these rotational speeds, act upon the connection sites between the rotational body 1 and the hubs 21, 22 or between the hubs 21, 22 and the journal 24 (or the shaft 23), and to nevertheless ensure an effective transmission of the torques between the drive unit (here the motor 26) and the rotational body 1 by virtue of tangential dimensional stability. Owing to its material and its geometric shape, the hub 21, 22 also has radial strainability that can be suitably adjusted so that it can follow the strain of the rotational body 1, particularly at very high rotational speeds. In this manner, critical tensile stresses between the rotational body 1 and the hubs 21, 22 are avoided, which could otherwise cause damage to the hub 21, 22 and bending or detachment of the rotational body 1 from the hub 21, 22 at very high rotational speeds. Through the use of CFRP (carbon fiber-reinforced plastic) laminate, the hubs 21, 22 also account for favorable crash behavior in case the rotor 2 crashes in the flywheel energy storage unit. Moreover, the weight of the hubs 21, 22 and thus of the rotor 1 can be lowered in comparison to conventional hubs and corresponding rotors, which translates into a simpler mounting of the rotor 1 on bearings. The hubs 21, 22 can be made, for example, in one piece of a fiber material in conjunction with a matrix system. Here, the matrix material completely surrounds the braid of fibers, whereby the fibers in this braid cross each other in two different orientations. In this context, the braid can be manufactured with different levels of tightness. A high fiber volume fraction is desired for the manufacture of the hubs 21, 22. A rotor according to the invention has a length of, for instance, 1300 mm, an outer diameter of 350 mm and a wall thickness (of the cylinder jacket) of 20 mm. The weight of such a rotor 1 is approximately 40 kg. The hubs 21, 22 here have an outer diameter that is adapted to the inner diameter of the rotational body 1. In one embodiment, the hubs 21, 22 are arranged within the cylindrical rotational body 1 in such a way that the hubs 21, 22 do not protrude out of the open cylinder base surfaces 12, 13. Consequently, the bearing 24 is situated inside the cylinder jacket 11 and is not directly affected in case the rotor 1 crashes.

Figure 5:
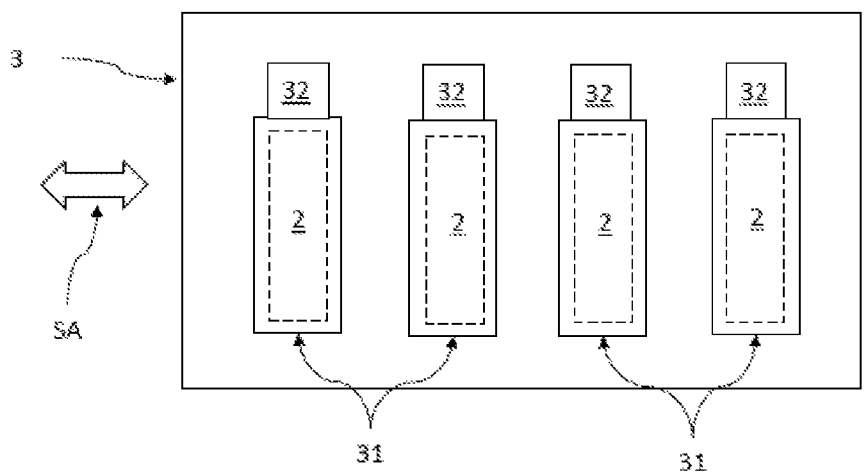
FIG. 5: a schematic view of an embodiment of the flywheel energy storage unit according to the invention.

FIG. 5 shows a schematic view of an embodiment of the flywheel energy storage unit 3 according to the invention, having several (in this embodiment, four) rotors 2 according to the invention that are each surrounded by a machine housing 31 (see, for example, FIG. 4), whereby the rotor 2 can be accelerated by a motor-generator unit 32 (instead of the motor unit 26 of FIG. 4) of the flywheel energy storage unit 3 in order to store SA electric energy and it can be braked in order to release SA electric energy.

Figure 6:
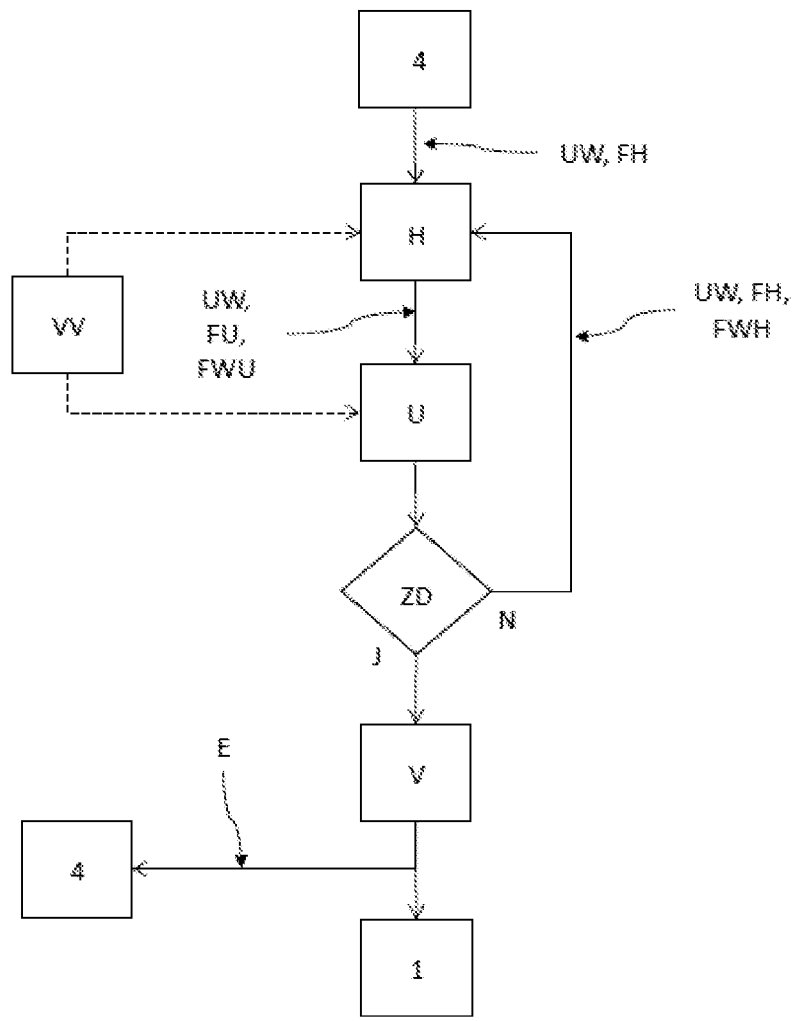
FIG. 6: an embodiment of the method according to the invention, for the production of the rotational body according to the invention.

FIG. 6 shows an embodiment of the method according to the invention for the production of the rotational body 1 according to the invention, having a cylinder jacket 11, a cylindrical axis as the axis of rotation R, open cylinder base surfaces 12, 13 and a length LW parallel to the axis of rotation R amounting to more than twice the provided outer diameter AD of the rotational body 1 (as shown in FIG. 1), comprising the following steps: a suitable, appertaining winding mandrel 4 is provided in order to manufacture the rotational body 1, at least partially using fiber-reinforced composite; helical layers H consisting of fibers FH having a fiber orientation along a helical fiber angle FWH smaller than 35° relative to the axis of rotation R and circumferential layers U consisting of fibers FU having a fiber orientation along a circumferential fiber angle FWU greater than 80° relative to the axis of rotation R are wound UW alternatingly around the winding mandrel 4 using a suitable winding method until the desired thickness ZD has been achieved for the cylinder jacket 11 amounting to less than 12.5% of the outer diameter AD of the cylinder jacket 11, whereby all of the helical layers H are arranged within the inner one-third of the cylinder jacket 11 as seen in the radial direction RR; the fiber-reinforced composite of the rotational body 1 is cross-linked V, and the winding mandrel 4 is removed E from the wound and cross-linked rotational body 1. In one embodiment, in addition, while the alternating helical layers H and circumferential layers U are being wound around the winding mandrel 4, the method also comprises pre-cross-linking steps VV after the winding mandrel 4 has been wound U with one helical layer H and/or one circumferential layer U.

The embodiments shown here constitute merely examples of the present invention and consequently must not be construed as being of a limiting nature. Alternative embodiments taken into consideration by the person skilled in the art are likewise encompassed by the protective scope of the present invention.

The invention claimed is:

1. An internally hollow cylindrical rotational body for rotors for flywheel energy storage units, having a cylinder jacket that is at least partially wound using a fiber-reinforced composite, also having a cylinder axis as an axis of rotation and having open cylinder base surfaces, whereby the cylinder jacket has an inside facing the axis of rotation and an outside oriented in the opposite direction, and has a length parallel to the axis of rotation of more than twice the outer diameter of the rotational body, and a wall thickness that is less than 15% of the outer diameter, whereby the fiber-reinforced composite of the cylinder jacket has a layered structure in a radial direction comprising several helical layers of fibers which extend along the axis of rotation and whose orientation along a helical fiber angle is between 15° and 30° relative to the axis of rotation, and comprising several circumferential layers which are arranged tangentially thereto over the length of the cylinder jacket and which consist of fibers whose orientation along a circumferential fiber angle is greater than 80° relative to the axis of rotation, whereby the helical layers and the circumferential layers are arranged alternatingly one above the other, and all of the helical layers are arranged in the inner one-third of the cylinder jacket (11), as seen in the radial direction, whereby the helical fiber angles of the various helical layers differ and the helical fiber angles increase in the radial direction from one helical layer to the next helical layer as the distance from the axis of rotation increases.

2. The rotational body according to claim 1, characterized in that
the helical fiber angles increase in the radial direction from 23° to 30°.

3. The rotational body according to claim 1, characterized in that,
the layered structure of the fiber-reinforced composite of the cylinder jacket comprises at least five helical layers.

4. The rotational body according to claim 3, characterized in that
the total thickness of all of the helical layers does not amount to more than 12.5% of the wall thickness of the cylinder jacket.

5. The rotational body according to claim 1, characterized in that,
the individual helical layers have a helical layer thickness in the radial direction that is smaller than 4% of the wall thickness of the cylinder jacket.

6. The rotational body according to claim 5, characterized in that,
the helical layer thickness of the individual helical layers is less than 0.5 mm.

7. The rotational body according to claim 5, characterized in that
the helical layer thickness only amounts to the thickness of two helical fiber layers arranged crosswise over each other.

8. The rotational body according to claim 1, characterized in that,
the cylinder jacket is made completely of fiber-reinforced composite.

9. A rotor, comprising an internally hollow cylindrical rotational body according to claim 1.

10. A flywheel energy storage unit, having one or more rotors that are each surrounded by a machine housing, comprising an internally hollow cylindrical rotational body having a cylinder jacket that is at least partially wound using a fiber-reinforced composite, also having a cylinder axis as an axis of rotation and having open cylinder base surfaces, whereby the cylinder jacket has an inside facing the axis of rotation and an outside oriented in the opposite direction, has a length parallel to the axis of rotation of more than twice the outer diameter of the rotational body, and a wall thickness that is less than 15% of the outer diameter, whereby the fiber-reinforced composite of the cylinder jacket has a layered structure in a radial direction comprising several helical layers of fibers which extend along the axis of rotation, with an orientation along a helical fiber angle relative to the axis of rotation, and comprising several circumferential layers which are arranged tangentially thereto over the length (LM) of the cylinder jacket and which consist of fibers whose orientation along the circumferential fiber angle is greater than 80° relative to the axis of rotation, whereby the helical layers and the circumferential layers are arranged alternatingly one above the other, and all of the helical layers are arranged in the inner one-third of the cylinder jacket, as seen in the radial direction, whereby the rotor can be accelerated by a motor-generator unit of the flywheel energy storage unit in order to store electric energy and can be braked in order to release electric energy.

11. A method for the production of an internally hollow cylindrical rotational body according to claim 1 for rotors for flywheel energy storage units, having said cylinder jacket, said cylindrical axis as the axis of rotation, said open cylinder base surfaces and said length parallel to the axis of rotation amounting to more than twice the provided outer diameter of the rotational body, comprising the following steps:
  (a) an appertaining winding mandrel is provided for the manufacture of the rotational body, whereby the cylinder jacket is wound, at least partially, using fiber-reinforced composite;
  (b) said helical layers consisting of fibers having an orientation along a helical fiber angle between 15° and 30° relative to the axis of rotation and said circumferential layers consisting of fibers having an orientation along a circumferential fiber angle greater than 80° relative to the axis of rotation are wound alternatingly around the winding mandrel until a desired thickness has been achieved for the cylinder jacket amounting to less than 15% of the outer diameter of the cylinder jacket, whereby all of the helical layers are arranged within the inner one-third of the cylinder jacket as seen in a radial direction, the helical fiber angles of the various helical layers differ and the helical fiber angles increase in the radial direction from one helical layer to the next helical layer as the distance from the axis of rotation increases; and
  (c) the fiber-reinforced composite of the rotational body is cross-linked and the winding mandrel is removed from the wound and cross-linked rotational body.

12. The method according to claim 11, whereby the step of winding the alternating helical layers and circumferential layers around the winding mandrel comprises additional pre-cross-linking steps each time after one helical layer and/or one circumferential layer has been wound on the winding mandrel.

* * * * *